(12) United States Patent
Yoshimura et al.

(10) Patent No.: US 7,004,450 B2
(45) Date of Patent: Feb. 28, 2006

(54) SOLENOID VALVE

(75) Inventors: Shinichi Yoshimura, Tsukuba-gun (JP); Minehiko Mita, Tsukuba-gun (JP)

(73) Assignee: SMC Corporation, Tokyp (JP)

( * ) Notice: Subject to any disclaimer, the term of this patent is extended or adjusted under 35 U.S.C. 154(b) by 58 days.

(21) Appl. No.: 10/686,559

(22) Filed: Oct. 17, 2003

(65) Prior Publication Data
US 2004/0084649 A1 May 6, 2004

(30) Foreign Application Priority Data
Nov. 6, 2002 (JP) ............................ 2002-323102

(51) Int. Cl.
*F16K 31/02* (2006.01)
(52) U.S. Cl. .................. 251/129.15; 335/278
(58) Field of Classification Search ........... 251/129.15; 335/278, 279
See application file for complete search history.

(56) References Cited

U.S. PATENT DOCUMENTS

| | | | | |
|---|---|---|---|---|
| 3,633,139 A | * | 1/1972 | Thompson | .................. 335/279 |
| 4,065,096 A | * | 12/1977 | Frantz et al. | ............. 251/129.1 |
| 4,501,299 A | * | 2/1985 | Klimowicz et al. | ..... 251/129.03 |
| 4,540,154 A | * | 9/1985 | Kolchinsky et al. | ......... 335/278 |
| 4,560,969 A | * | 12/1985 | Nicholson | .................... 335/279 |
| 5,192,936 A | * | 3/1993 | Neff et al. | .................... 335/278 |
| 5,310,160 A | | 5/1994 | Harck et al. | |
| 6,124,775 A | | 9/2000 | Linkner, Jr. | |
| 6,748,976 B1 | * | 6/2004 | Sato et al. | ............. 251/129.15 |

FOREIGN PATENT DOCUMENTS

| | | |
|---|---|---|
| DE | 27 51 230 | 5/1979 |
| DE | 42 01 449 | 7/1993 |
| DE | 199 19 396 | 11/1999 |

* cited by examiner

*Primary Examiner*—John Bastianelli
(74) *Attorney, Agent, or Firm*—Oblon, Spivak, McClelland, Maier & Neustadt, P.C.

(57) ABSTRACT

In a solenoid valve having a valve section having a valve member which comes into contact and separates from a valve seat to switch passages, and a solenoid portion for driving the valve member, the solenoid portion includes a fixed core, a bobbin around which a coil is wound, a cylindrical magnetic cover constituting an outer profile of the solenoid portion, a magnetic plate and a moving core. An electrical insulation film is formed on an inner surface or both inner and outer surfaces of the magnetic cover.

9 Claims, 8 Drawing Sheets

SOLENOID VALVE

TECHNICAL FIELD

The present invention relates to a solenoid valve capable of easily securing insulation performance of the solenoid valve without subjecting a coil of the solenoid valve to an insulating treatment.

BACKGROUND ART

In a solenoid valve having a valve member which switches passages by approaching a valve seat in a valve body, and a solenoid portion which drives the valve member in a direction approaching and separating from the valve seat, a coil of the solenoid portion is subjected to an integral sealing treatment using resin or an insulating treatment by means of resin tape after a magnet wire is wound around a bobbin. Therefore, there is a problem that the outside shape of the solenoid valve becomes large and the number of operation steps is increased. A magnetic cover is subjected to an anticorrosion surface treatment.

DISCLOSURE OF THE INVENTION

It is a technical object of the present invention to provide a solenoid valve in which the insulation performance of the solenoid valve can easily be secured without subjecting the coil of the solenoid valve to an insulating treatment, the outside shape of the solenoid valve is not increased and the number of operation steps is small.

It is another technical object of the invention to provide a solenoid valve capable of effectively the insulating treatment of the magnetic cover and capable of omitting the anticorrosion surface treatment of the magnetic cover.

To achieve the above objects, the present invention provides a solenoid valve comprising a valve section having a valve member which comes into contact and separates from a valve seat to switch passage, and a solenoid portion for driving the valve member, wherein the solenoid portion comprises a fixed magnetic member, a bobbin around which a coil is wound, a main magnetic cover surrounding the coil and constituting an outer profile of the solenoid portion, a magnetic plate provided in the magnetic cover adjacent to the bobbin, and a moving core which is slidably fitted into center holes formed such as to pass through the magnetic plate and the bobbin and which is adsorbed by the fixed magnetic member, an electrical insulation film is formed on at least an inner surface among inner and outer surfaces of the magnetic cover.

In the present invention, the electrical insulation film is formed by one of the following methods: a method for painting epoxy resin on the magnetic cover, a method for spraying fluorocarbon resin, a method for coating ceramic, and a method for vacuum depositing electrical insulation material (CVD).

According to one of concrete embodiments of the invention, the fixed magnetic member is a fixed core which is fitted and fixed to one end of the bobbin, the magnetic cover may be cylindrical in shape, the magnetic cover is integrally provided at its axial one end with an occluded section which comes into contact with the fixed core, and is provided at its other end with an opening section.

According to another concrete embodiment of the invention, the magnetic cover comprises a main cover provided at its axial opposite ends with opening sections, and a magnetic cap for closing one of the opening sections, the fixed magnetic member is fixed to the magnetic cap, and inserted into the center hole a of the bobbin.

According to another concrete embodiment of the invention, the magnetic cover comprises a main cover provided at its axial opposite ends with opening sections, and a magnetic cap for closing one of the opening sections, the magnetic cap is thicker than the cylindrical cover and also functions as the fixed magnetic member.

In the invention, it is preferable that the magnetic cover has a contact surface or joint surface with respect to a member constituting a magnetic circuit, and a film nonformed portion having no insulation film is formed on the contact surface or joint surface.

According to a preferred embodiment of the invention, a shape of a cross section of each of the bobbin, the center holes of the magnetic plate and the moving core is long ellipse or oval shape.

BEST MODE FOR CARRYING OUT THE INVENTION

Figure 1:
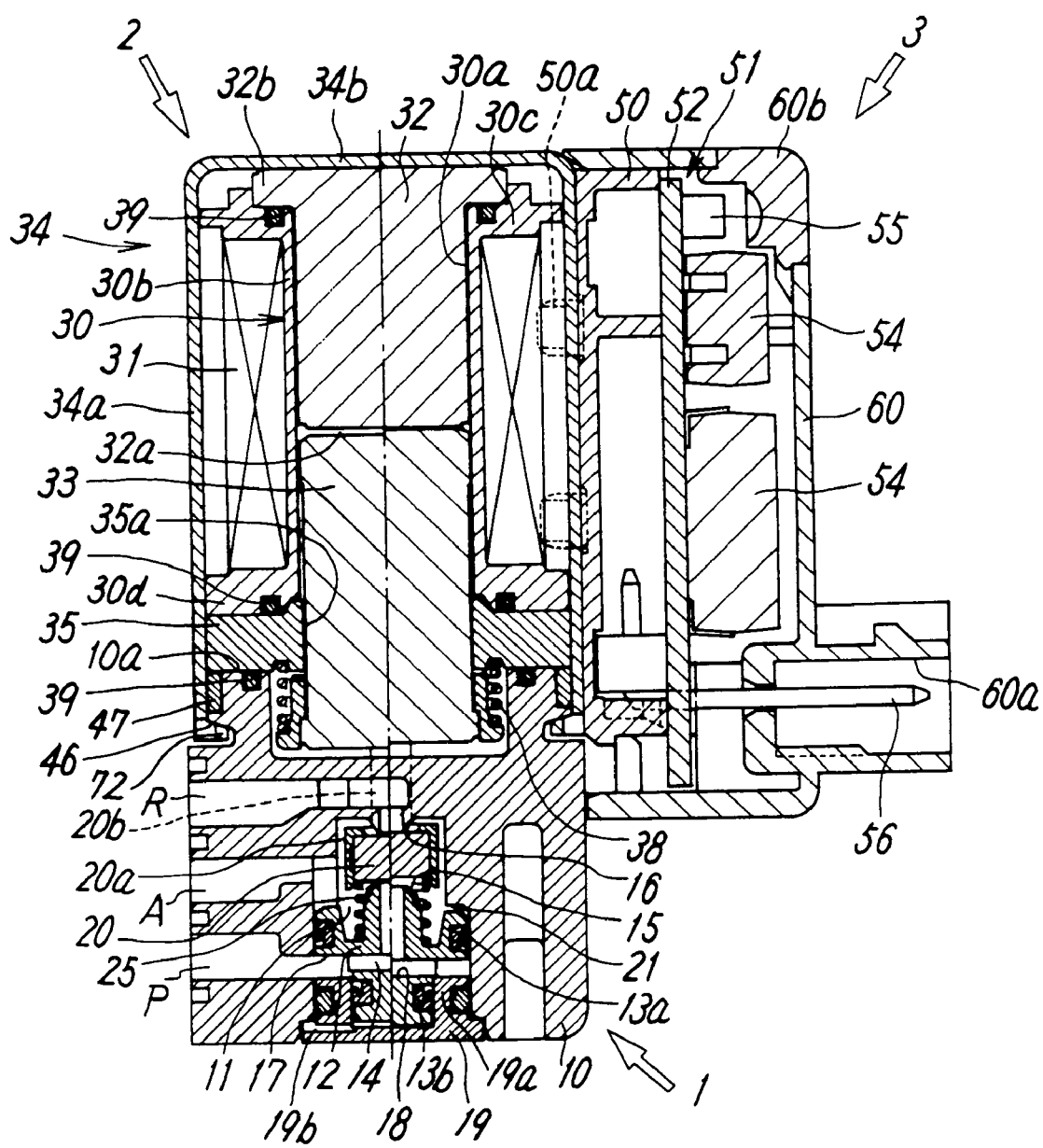
FIG. 1 is a side sectional view showing one embodiment of the solenoid valve according to the present invention, wherein a left half of a valve section and a solenoid portion shows a non-energization state with respect to the solenoid portion, and a right half shows an energization state with respect to the solenoid portion.
Figure 2:
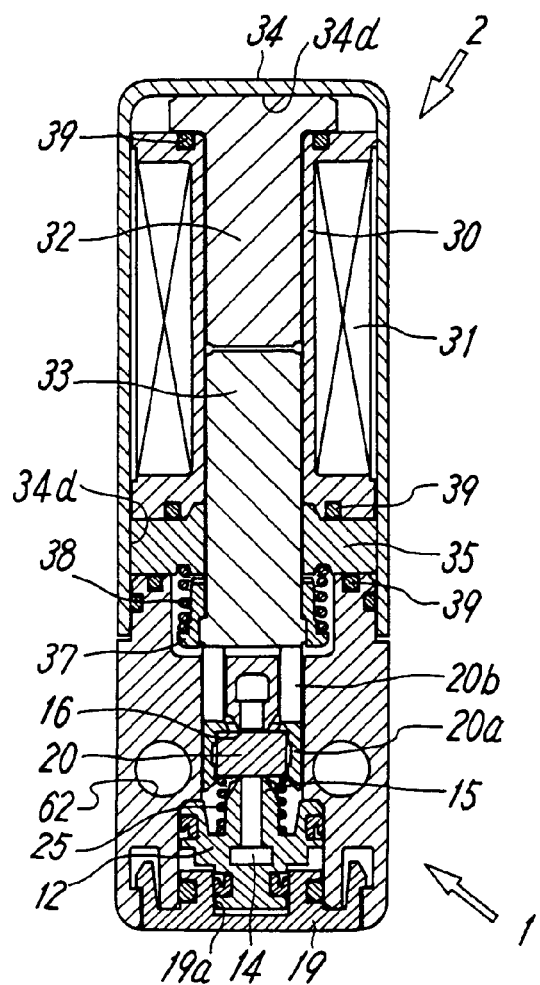
FIG. 2 is a vertical sectional view of the embodiment.
Figure 3:
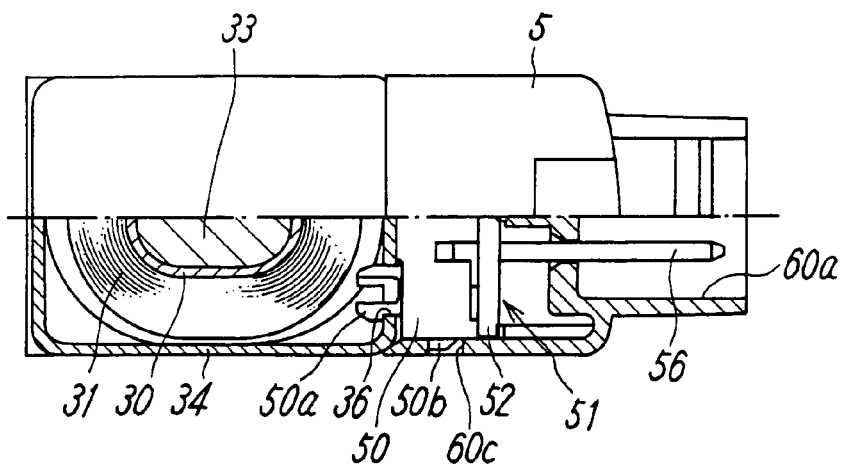
FIG. 3 is a partially plan sectional view of the embodiment.

FIGS. 1 to 7 show a first embodiment of a solenoid valve according to the present invention. The solenoid valve comprises a valve section 1 constituting a three-port connection valve, and a solenoid portion 2 for driving the valve section 1. A terminal casing 3 for energizing the solenoid portion 2 is provided along outer sides of the valve section 1 and the solenoid portion 2.

A valve body 10 in the valve section 1 is made of electrical insulation synthetic resin. The valve body 10 includes an input port P, an output port A, a discharge port R and a valve chamber 11 with which these ports are in communication. The valve chamber 11 is formed in a valve hole which opens at an outer end surface of the valve body 10 opposite from a joint surface 10a of the valve body 10 with respect to the solenoid portion 2. The input port P and the output port A which open at a side surface of the valve body 10 are brought into communication with the valve chamber 11 in succession from an opening section of a valve hole of the valve body 10. The discharge port R opens at a discharge valve seat 16 provided on an inner deep surface of the valve hole. Accommodated in the valve chamber 11 are a valve seat body 12 having a supply valve seat 15 which is in communication with the input port P through a passage 14, and a poppet type valve member 20 which selectively approach and separates from the supply valve seat 15 and the discharge valve seat 16. The valve hole opening section is closed by a presser plate 19.

The valve seat body 12 is provided around the valve seat body with the passage 14 which opens at a position where the passage 14 is in communication with the input port P. A diameter of the valve seat body 12 on the side of the presser plate 19 is smaller than a diameter of a portion of the valve seat body 12 where the passage 14 is provided. The valve seat body 12 is fitted into a cylindrical valve seat body receiving section 19a of the presser plate 19. The other end of the passage 14 opens in a supply valve seat 15 which is opposed to the valve member 20. Seal members 13a and 13b are disposed on the opposite sides of the passage 14 between the passage 14 and an inner surface of the valve chamber 11 to seal therebetween. In the sealed state, the valve seat body 12 is accommodated in the valve seat body receiving section 19a such that the valve seat body 12 can move in an axial direction of the valve hole. A space between the valve seat body 12 and the presser plate 19 opens into outside through a vent 19b.

A moving range of the valve seat body 12 toward the valve member 20 is limited by a stopper section 21 formed in the valve chamber 11. The stopper section 21 is provided at such a position where when the solenoid portion 2 is energized, the supply valve seat 15 is allowed to approach the valve member 20 which is in an abutment position against the discharge valve seat 16 and stops the valve member 20.

The valve seat body 12 includes a first fluid pressure application surface 17 and a second fluid pressure application surface 18 to which fluid pressure flowing into the passage 14 from the input port P applies. The first fluid pressure application surface 17 generates an application force which pushes the valve seat body 12 toward the valve member 20. The second fluid pressure application surface 18 generates an application force which pushes the valve seat body 12 in the opposite direction. A fluid pressure application effective area of the first fluid pressure application surface 17 is set greater than that of the second fluid pressure application surface 18. This area difference is formed by providing the valve seat body 12 with a small diameter portion which is inserted into the valve seat body receiving section 19a, and by forming a portion of the small diameter portion which faces the passage 14 as the second fluid pressure application surface 18.

Although the valve seat body 12 moves in the axial direction of the valve hole in this embodiment, the valve seat body 12 may be fixed of course.

The valve member 20 is disposed in the valve chamber 11 between the supply valve seat 15 and the discharge valve seat 16, and selectively opens and closes both the valve seats 15 and 16 by supplying current to the solenoid portion 2 or cutting the supply of current to the solenoid portion 2. In order to open and close the valve member 20 by the solenoid portion 2, the valve member 20 is provided with a pair of push rods 20b which are integrally formed on a cover 20a which is put on an outer periphery of the valve member 20, the push rods 20b are led out (see FIG. 2) toward the solenoid portion 2 from a hole formed in the valve body 10 at a position astride the discharge valve seat 16, and tip ends of the push rods 20b are brought into abutment against a moving core 33 of the solenoid portion 2.

A poppet spring 25 for pushing the valve member 20 toward the discharge valve seat 16 is interposed between the valve member 20 and a periphery of the supply valve seat 15 of the valve seat body 12. A biasing force of the poppet spring 25 does not exceed a biasing force generated in the valve seat body 12 by the area difference between the first and second fluid pressure application surfaces 17 and 18 in the valve seat body 12.

As clearly shown in FIGS. 1 to 3 and 7, the solenoid portion 2 comprises a fixed core 32 as a fixed magnetic member, a bobbin 30 around which a coil 31 is wound, a prismatic magnetic cover 34 surrounding the coil 31 and constituting a profile of the solenoid portion, a magnetic plate 35 provided in the magnetic cover 34 adjacent to the bobbin 30, and the moving core 33 which is slidably fitted into a center hole 30a of the bobbin 30 and a center hole 35a of the magnetic plate 35. The moving core 33 is attracted by the fixed core 32.

More specifically, the magnetic cover 34 is made of magnetic material (iron plate) by deep-drawing. The magnetic cover 34 comprises a section 34a having a rectangular cross section, an occluded section 34b integrally formed on one end of the section 34a in its axial direction, and an opening section 34c formed in the other side of the section 34a. An inner surface and an outer surface of the magnetic cover 34 are formed with thin electrical insulation films 41 made of electrical insulation material.

The bobbin 30 includes a cylindrical portion 30b around which the coil 31 is wound, and flange portions 30c and 30d which are integrally formed on opposite ends of the cylindrical portion 30b. The fixed core 32 is provided at its one end with a magnetic pole surface 32a and at its other end with a flange portion 32b. In a state in which an end of the flange portion 32b slightly projects from an upper surface of the flange portion 30c of the bobbin 30, the fixed core 32 is fitted and fixed into one end of the center hole 30a of the bobbin 30.

The occluded section 34b of the magnetic cover 34 comes into contact with the fixed core 32 and the magnetic cover 34 covers the fixed core 32. The magnetic cover 34, the fixed core 32, the moving core 33 and the magnetic plate 35 form a magnetic path around the coil 31.

Cross sections of the fixed core 32 and the moving core 33 are formed into an ellipse or an oval shape. With this design, they can efficiently generate magnetic attraction force. With this, center holes of the bobbin 30 and the magnetic plate 35 have the same shapes.

The magnetic cover 34 has a shape which can cover the entire fixed core 32, moving core 33, bobbin 30, coil 31 and magnetic plate 35. The magnetic cover 34 is provided at its side surface with a mounting hole 36 of the terminal casing 3. Alternatively, the mounting hole 36 may be omitted, and the terminal casing may be adhered or fixed by means which does not hinder the liquid-tightness of the magnetic cover 34. With this design also, the waterproof and slip resistance of the solenoid portion 2 can be secured.

The bobbin 30 is provided with a pair of energization terminals 40 which constitute an energization system for the solenoid portion 2 (FIG. 7), and the energization terminals 40 project toward an opened end of the magnetic cover 34 through notches of the magnetic plate 35.

A ring 37 made of synthetic resin is fitted over an outer end of the moving core 33. A return spring 38 of the moving core 33 is compressed between the ring 37 and the magnetic plate 35. The ring 37 also has a function as a stopper which stops the moving core 33 immediately before it is adsorbed by the fixed core 32. In the drawing, a reference number 39 represents a seal material.

As a method for forming an insulation film 41 on the magnetic cover 34, there are a method for painting epoxy resin on the magnetic cover 34, a method for spraying fluorocarbon resin on the magnetic cover 34, a method for coating ceramic, and a method for vacuum depositing electrical insulation material, but the method need not be limited to those, and other method may be used for forming the insulation film on the magnetic cover 34.

Although the insulation films 41 are formed on both inner and outer surfaces of the magnetic cover 34 in the embodiment, the insulation film 41 may be formed only on the inner surface of the magnetic cover 34.

The insulation film 41 may be formed on the entire inner surface or entire inner and outer surfaces of the magnetic cover 34, but a portion of such a surface to which a member or the like constituting a magnetic circuit such as the magnetic plate 35 or fixed core 32 comes into contact can be provided with a film non-formed portion 34d where the insulation film 41 is not formed. If the magnetic cover 34 and the magnetic circuit constituting member come into contact or join to each other at the position of the film non-formed portion 34d, the magnetic resistance can be reduced as compared with a case in which they come into contact or join to each other through the insulation film 41.

The film non-formed portion 34d can be formed by subjecting that portion to a masking when the insulation film 41 is formed on the magnetic cover 34.

The effect of the valve section 1 will be briefly explained. When the solenoid portion 2 is in its non-energized state, the valve member 20 opens the discharge valve seat 16 as shown in left half of FIG. 1, the output port A is brought into communication with the discharge port R and the output port A is opened into atmosphere. The supply valve seat 15 is closed by the valve member 20. In this case, air pressure flowing into the passage 14 of the valve seat body 12 from the input port P is applied to the first and second fluid pressure application surfaces 17 and 18, but since the area of the first fluid pressure application surface 17 is greater than that of the second fluid pressure application surface 18, the valve seat body 12 is displaced in a direction abutting against the stopper section 21 in the valve body 10, the supply valve seat 15 is in a position close to a position of the valve member 20 at the time of energization to the solenoid portion 2, and the valve seat body 12 is closed by the valve member 20.

If the solenoid portion 2 is energized in this state, as shown in right half of FIG. 1, the moving core 33 is adsorbed by the fixed core 32, the supply valve seat 15 is opened and the discharge valve seat 16 is closed at the same time, but the supply valve seat 15 is previously displaced to a position where the supply valve seat 15 comes into contact with the valve member 20 at the time of energization, and the moving core 33 is only required to adsorb by small stroke and thus, the attraction force applied to the moving core 33 is increased or attraction force required for opening the valve can be generated by a small solenoid, and the supply valve seat 15 can easily be opened.

If the supply valve seat 15 is opened in this manner, compressed air flows into a secondary chamber of the valve seat through the supply valve seat 15. Therefore, the valve seat body 12 is moved in a direction separating from the valve member 20 by fluid pressure applied to the second fluid pressure application surface 18. With this the valve member 20 is separated from the supply valve seat 15 and its opening amount is further increased, and the valve opens such that a large flow rate can be obtained.

Next, if the supply of current to the solenoid portion 2 is stopped, the moving core 33 is returned by a biasing force of the return spring 38 to close the supply valve seat 15 and open the discharge valve seat 16 at the same time. As a result, the valve seat body 12 is moved toward the valve member 20 by fluid pressure of the passage 14, the valve seat body 12 abuts against the stopper section 21, and the valve seat body 12 is ready for opening with small stroke of the moving core 33.

Figure 4:
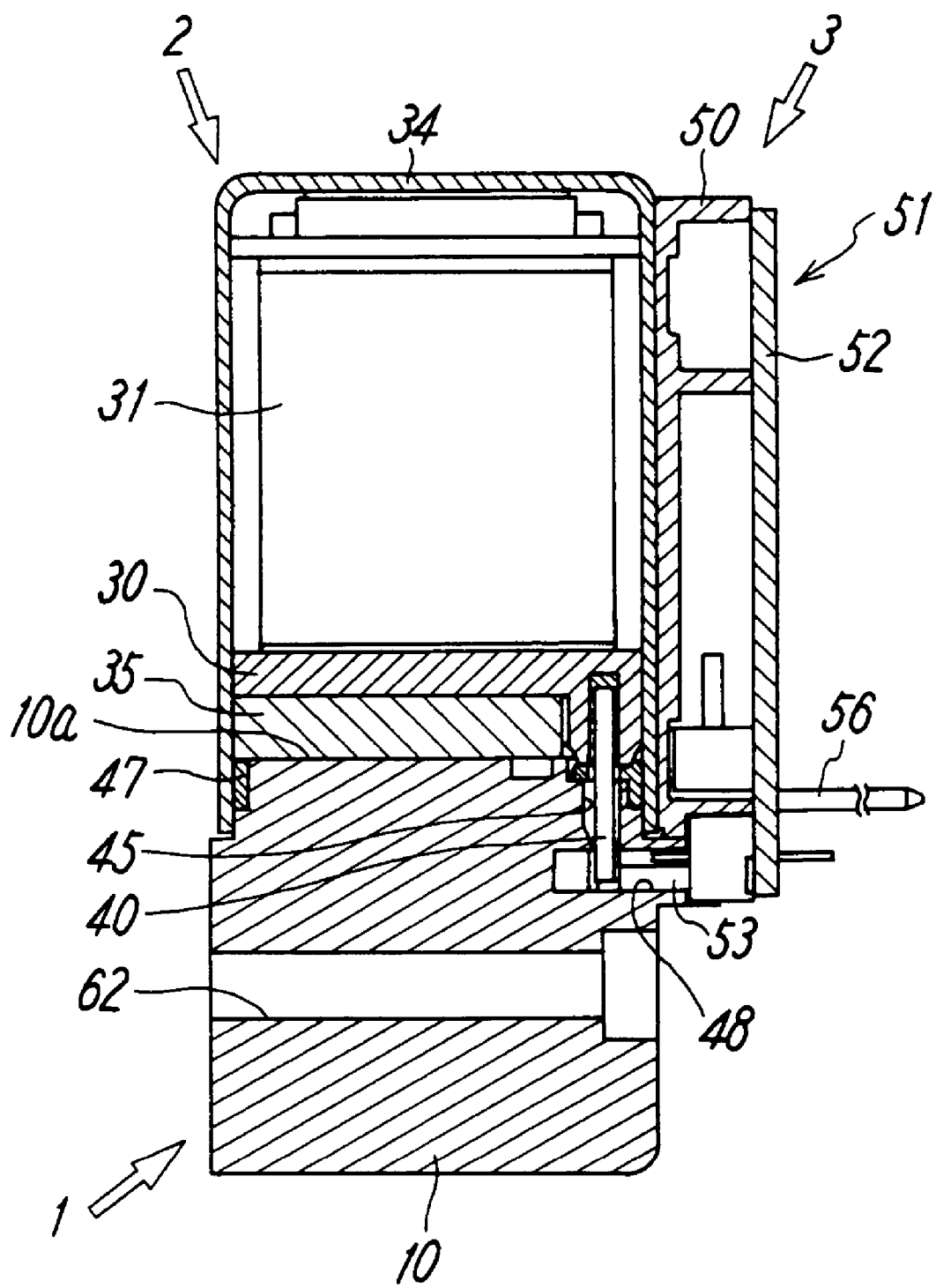
FIG. 4 is a sectional view of an essential portion of the embodiment at a position (taken along an arrow IV in FIG. 5) different from that shown in FIG. 1.
Figure 5:
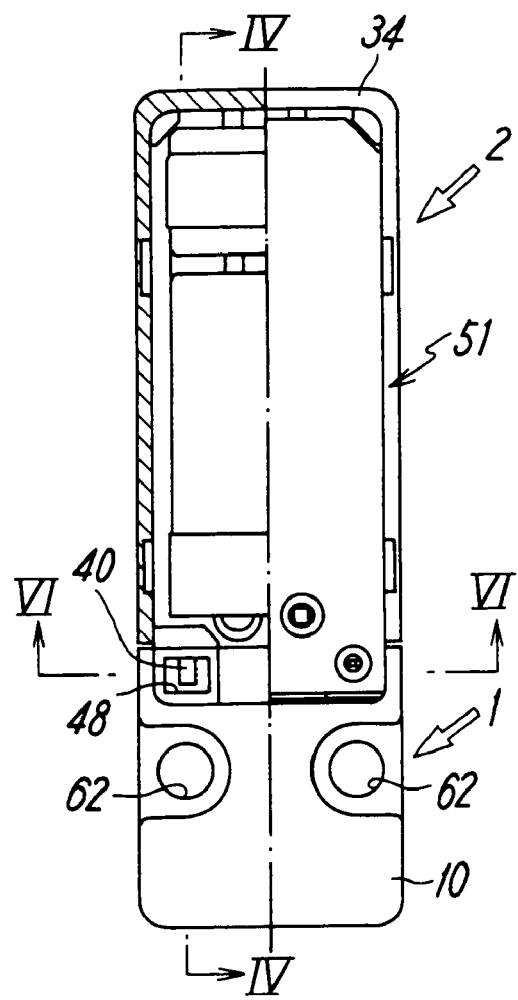
FIG. 5 is a partial vertical sectional view of the embodiment at a position different from that shown in FIG. 2.
Figure 6:
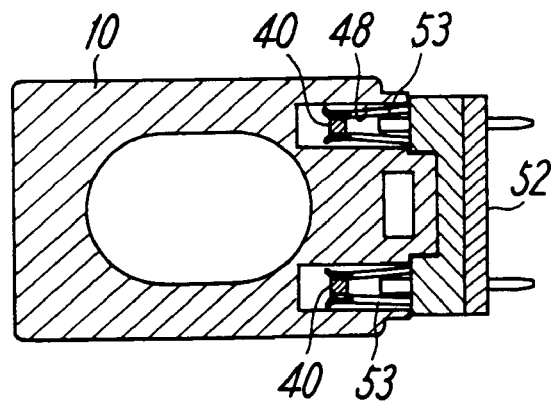
FIG. 6 is a partial plan sectional view of the embodiment at a position (taken along an arrow VI in FIG. 5) different from that shown in FIG. 3.
Figure 7:
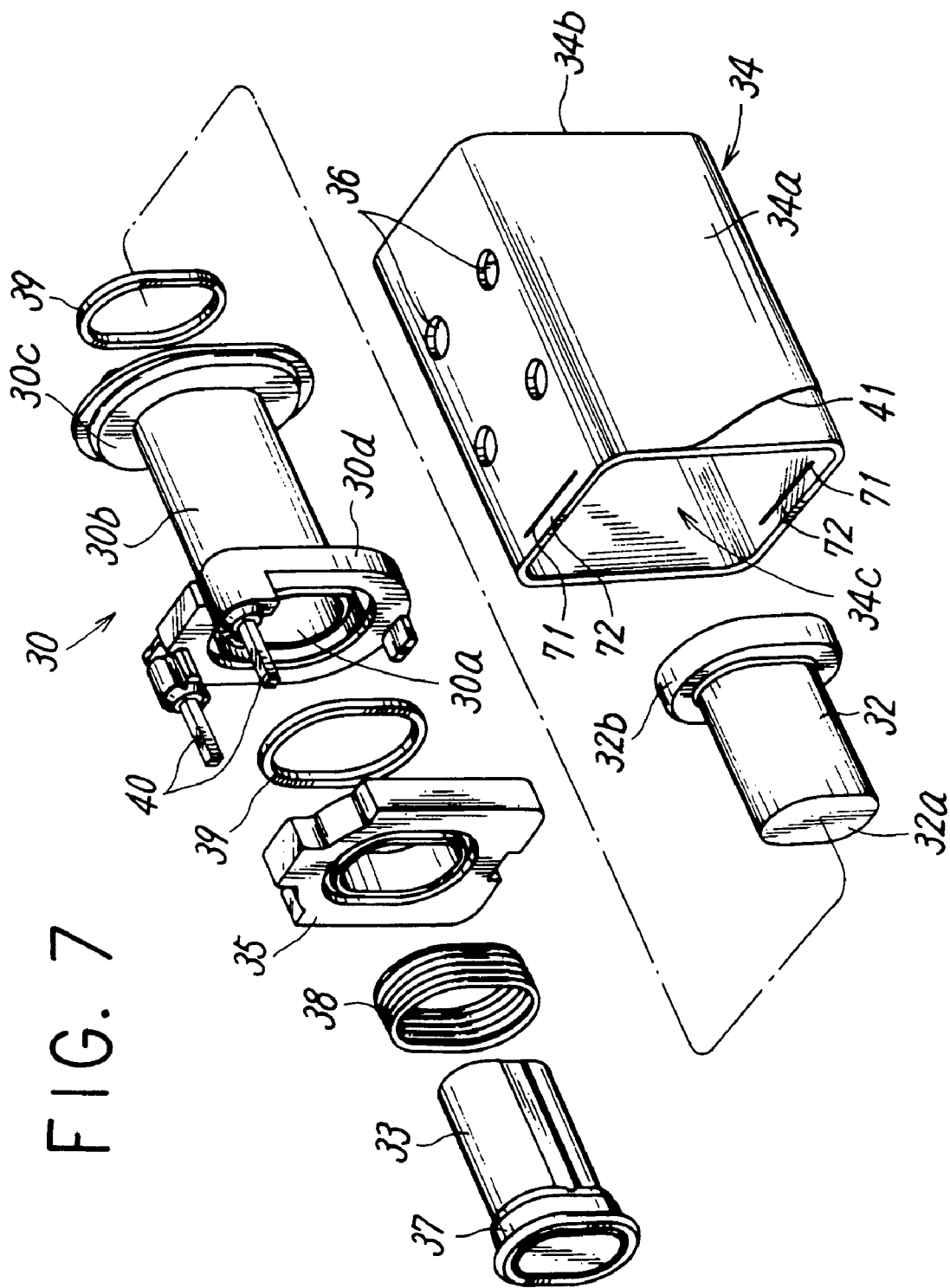
FIG. 7 is an exploded perspective view showing a structure of the solenoid portion in the embodiment.

As clearly shown in FIGS. 4 to 6, a terminal insertion hole 45 is formed in a joint surface 10a of the valve body 10 made of synthetic resin having electrical insulation performance with respect to the solenoid portion 2. In a state in which an energization terminals 40 projecting from the bobbin 30 of the solenoid portion 2 is inserted into the terminal insertion hole 45, the solenoid portion 2 and the valve section 1 are fixed. It is preferable to fix the solenoid portion 2 and the valve section 1 by inwardly deforming an engaging section 72 formed by forming a slit 71 in the magnetic cover 34 and by engaging the engaging section 72 with a recess 46 formed in the valve body 10. Other means may be used. When the solenoid portion and the valve section 1 are fixed, if a seal member 47 is interposed therebetween, the mounting hole 36 of the terminal casing 3 may be removed and the solenoid portion 2 can be formed in a liquid-tight manner.

The terminal casing 3 is fixed to the solenoid portion 2 by the mounting hole 36 formed in a side surface of the magnetic cover 34. The terminal casing 3 has a synthetic resin terminal stage 50 which constitutes a base of the terminal casing 3. The terminal casing 3 is provided with a projecting element 50a which is elastically deformed. The projecting element 50a is fitted into the mounting hole 36 under pressure, thereby fixing the projecting element 50a to the magnetic cover 34. Aboard assembly 51 is placed on the terminal stage 50, and a connector cover 60 is put on the board assembly 51. The board assembly 51 has a printed board 52. Provided on the board 52 are a contact terminal 53 which extends to the energization terminals 40 in the terminal insertion hole 45 and electrically connected to the energization terminals 40, various energization circuit electronic parts 54 including an energization display lamp 55, and a connector energization pin 56 which is connected to an outside power supply.

It is not always necessary to mount the terminal casing 3 on the solenoid portion 2, and the terminal casing 3 may be mounted on the valve body 10 in the valve section 1 or may be mounted on both the valve body 10 and the solenoid portion 2.

The contact terminal 53 connected to the energization terminals 40 is inserted into the terminal insertion hole 45 in the valve body 10 through an opening 48 which is in communication with outside of the valve body. The contact terminal 53 comprises a pair of elastic contacts which extend to the energization terminals 40 in the terminal insertion hole 45 and elastically sandwich the energization terminals 40 (see FIG. 6). A connector energization pin 56 is fixed to the board 52 and is disposed such as to extend into a connector connection opening 60a of the connector cover 60.

The connector cover 60 basically covers the entire board assembly 51 on which the various energization circuit electronic parts 54 are mounted. The connector cover 60 is mounted by engaging a projection 50b provided on the terminal stage 50 with an engaging hole 60c (see FIG. 3). The entire terminal casing 3 can be formed in a liquid tight manner if necessary. The terminal casing 3 includes not only the connector connection opening 60a which receives the energization pin 56 but also a light transmission lamp window 60b located outside the energization display lamp 55.

A reference number 62 in the drawings represents a bolt hole for fixing the solenoid valve.

In the solenoid valve having the above-described structure, since the insulation film is formed on an inner surface or both inner and outer surfaces of the magnetic cover 34, the insulation performance of the solenoid valve can easily be secured without subjecting the coil 31 for the solenoid valve to the insulating treatment. Since it is unnecessary to subject the coil 31 to the insulating treatment using sealing or resin tape, the outer shape is not increased and the number of producing steps is small. Since the insulation film is formed, it is unnecessary to subject the magnetic cover 34 to the anticorrosion surface treatment.

Figure 8:
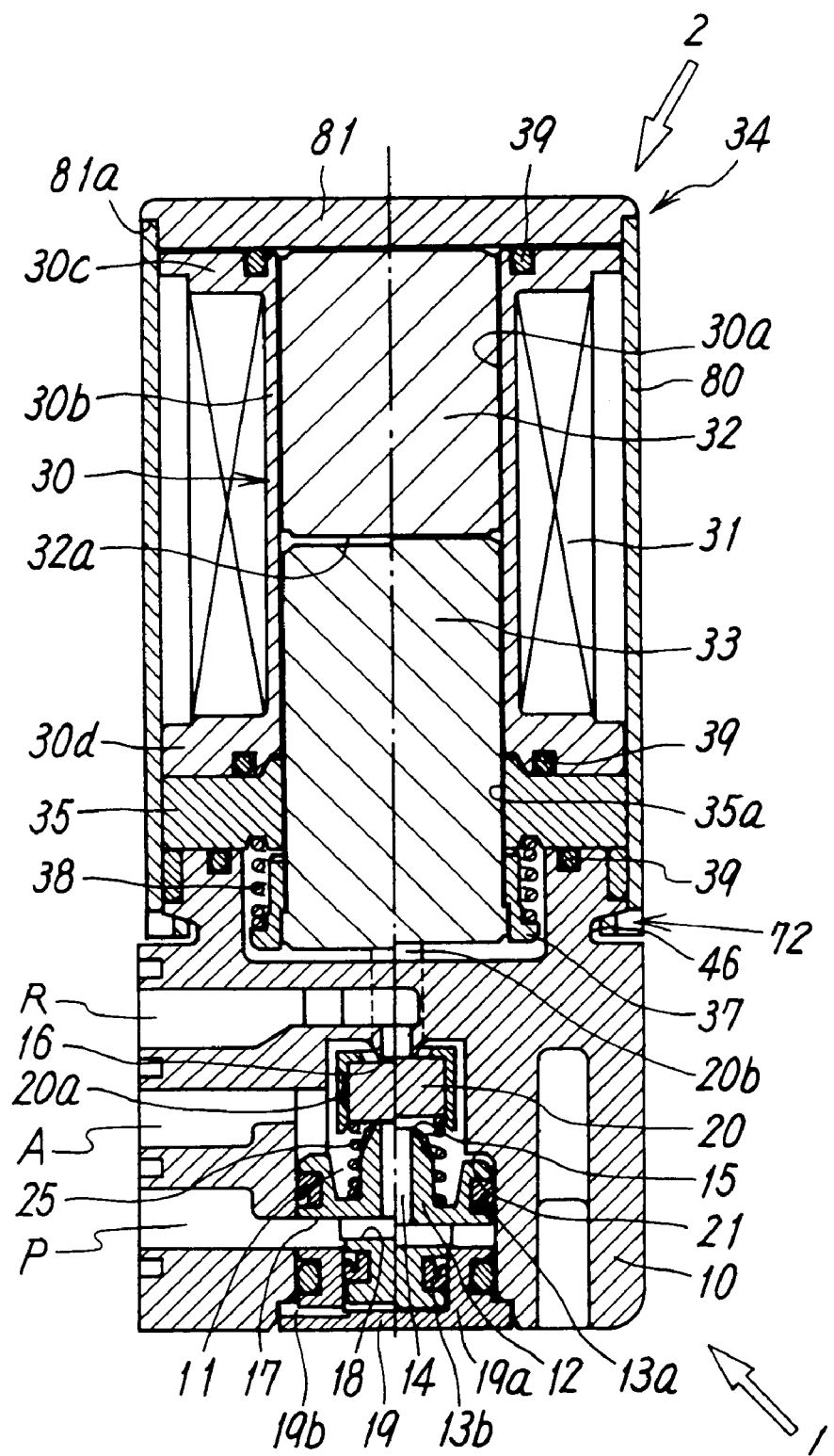
FIG. 8 is a side sectional view showing another embodiment of the solenoid valve according to the present invention, wherein a left half of the valve section and the solenoid portion shows a non-energization state with respect to the solenoid portion, and a right half shows an energization state with respect to the solenoid portion.
Figure 9:
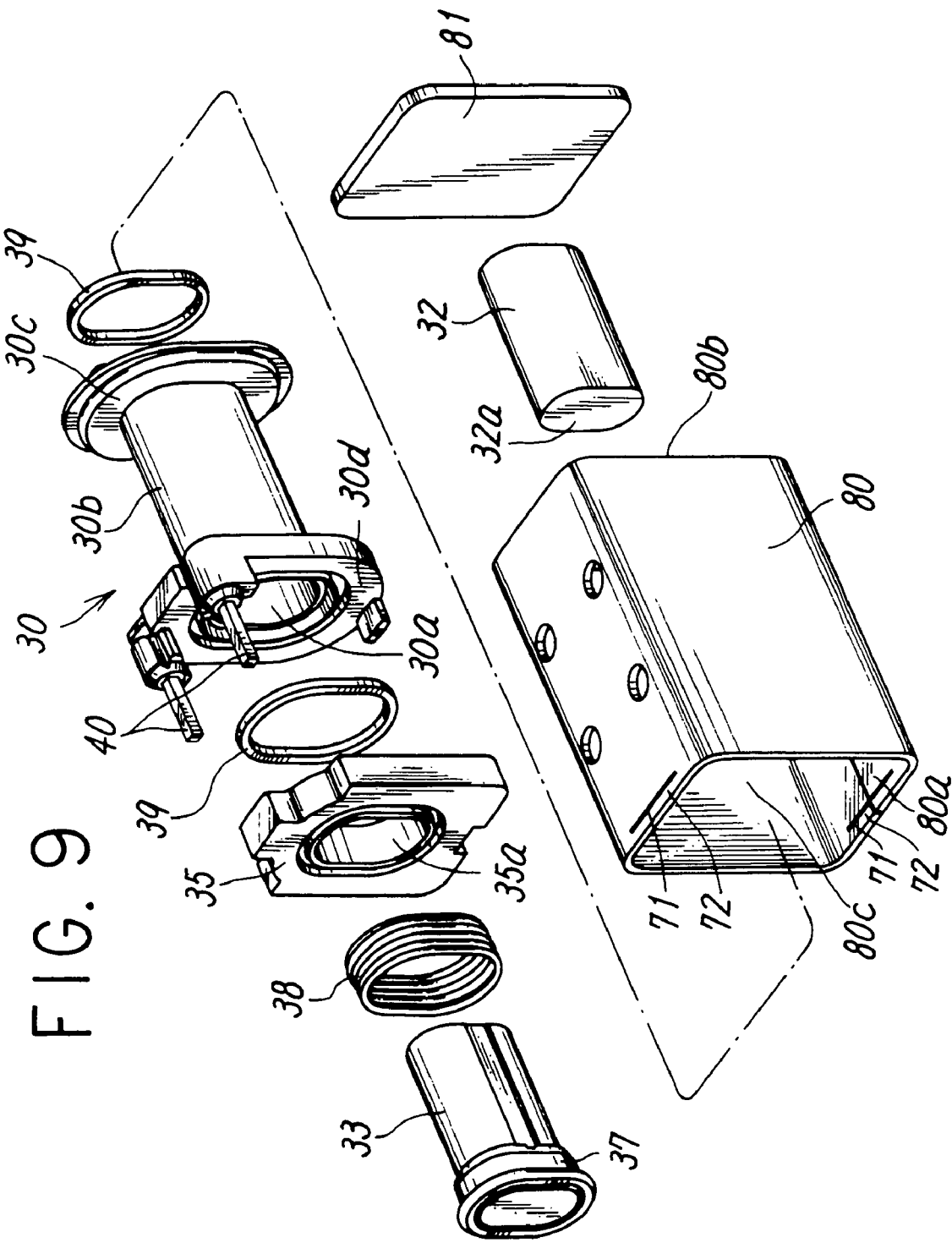
FIG. 9 is an exploded perspective view showing a structure of the solenoid portion in the embodiment.

FIGS. 8 to 9 show a second embodiment of the solenoid valve of the present invention. The magnetic cover 34 of this solenoid valve comprises a main cover 80 having a rectangular cross section and provided at its opposite sides with opening sections 80b and 80c, and a magnetic cap 81 having the same rectangular cross section as the main cover 80. The main cover 80 is formed by bending a magnetic plate such that its cross section becomes substantially rectangular shape and by fixing a joint end 80a by means of welding or the like. The magnetic cap 81 is thicker than the main cover 80. A step 81a having a width which is about the same as a thickness of the main cover 80 is provided around the magnetic cap 81. The step 81a is fitted into and fixed to the one of the opening sections 80b of the main cover 80, thereby closing the opening section 80b.

The fixed core 32 as a fixed magnetic member is fixed to an inner surface of the magnetic cap 81 by welding or the like. The fixed core 32 is inserted into a substantially central portion of the center hole 30a of the bobbin 30. Although the fixed core 32 is independent from the magnetic cap 81 in this embodiment, the fixed core 32 and the magnetic cap 81 may be formed as one piece.

Like the first embodiment, the insulation film 41 is formed on inner surfaces or both inner and outer surfaces of the main cover 80 and the magnetic cap 81 which constitute the magnetic cover 34. In this case, it is preferable that a film non-formed portion where the insulation film 41 is not provided is formed on portions of the opening section 80b and the step 81a at which the main cover 80 and the magnetic cap 81 come into contact, a portion of the main cover 80 against which the inner surface magnetic plate 35 abuts, or a portion of the magnetic cap 81 against which the inner surface fixed core 32 comes into contact.

Since other structure of the embodiment shown in FIGS. 8 to 9 is the same as the previous embodiment shown in FIGS. 1 to 7, the same or corresponding elements are designated with the same symbols, and explanation thereof is omitted.

According to the embodiment shown in FIGS. 8 to 9, the magnetic cover 34 has such a structure that one of the opening sections 80b of the main cover 80 in which a magnetic plate is bent in one direction and opposed ends are connected to each other is closed by the separate magnetic cap 81. Therefore, waste of material can be reduced irrespective of shape of the cross section of the magnetic cover 34, and the solenoid valve can easily and inexpensively be produced.

Figure 10:
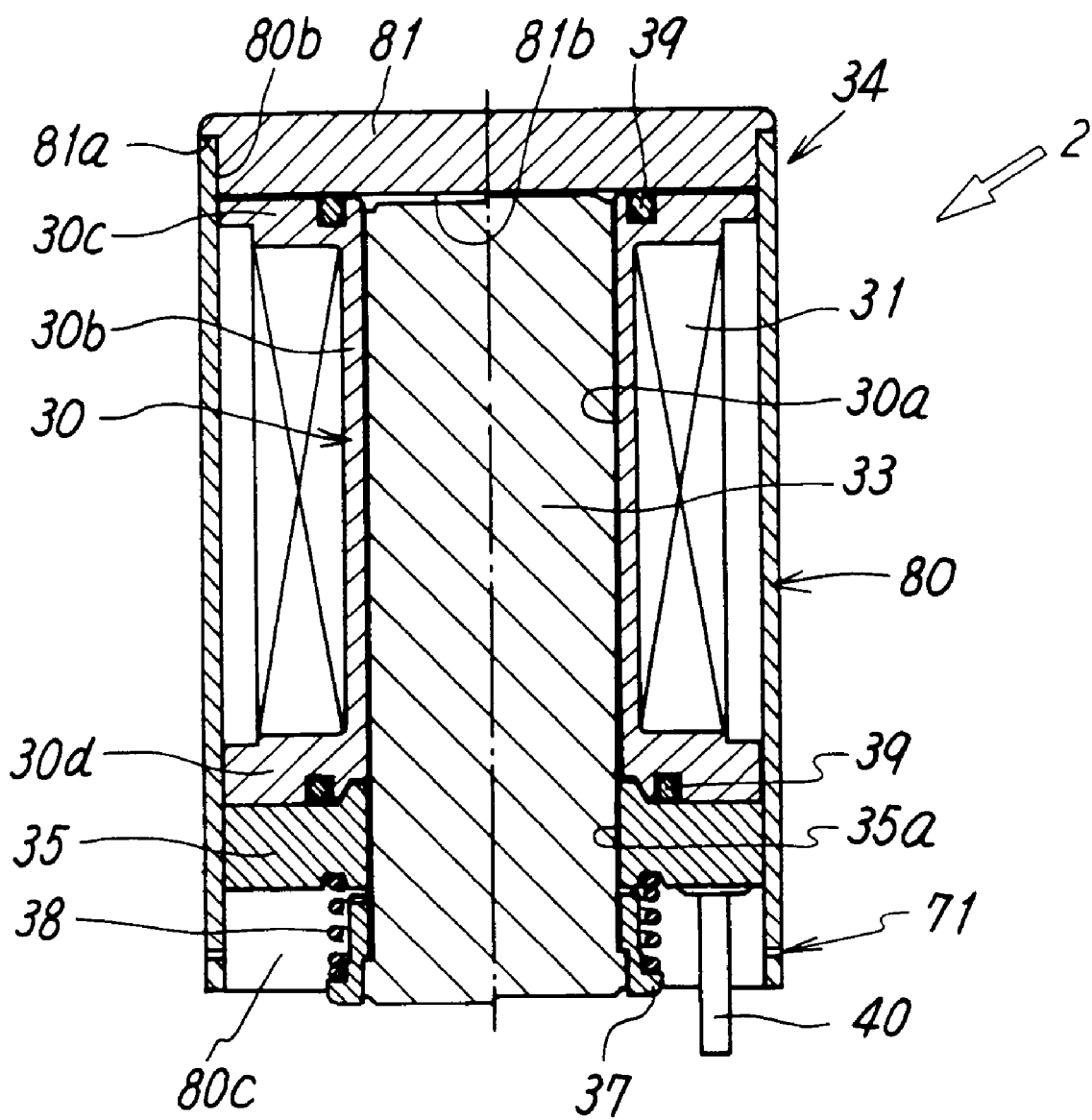
FIG. 10 is a side sectional view showing another embodiment of the solenoid valve according to the present invention, wherein a left half of the valve section and the solenoid portion shows a non-energization state with respect to the solenoid portion, and a right half shows an energization state with respect to the solenoid portion.

FIG. 10 shows a third embodiment of the solenoid valve of the present invention. In this embodiment, the magnetic cap 81 which is thicker than the main cover 80 also functions as a fixed magnetic member 32. An inner surface of the magnetic cap 81 is flat and forms a magnetic pole surface 81b. Therefore, the fixed core comprising a separate member is not provided unlike the second embodiment.

An end of the moving core 33 reaches an end of the bobbin 30 on the side of the magnetic cap 81 through the center hole 30a of the bobbin 30. If current is supplied to the coil 31, the end of the moving core 33 comes into contact and separates from the magnetic pole surface 81b formed on an inner surface of the magnetic cap 81. The magnetic pole surface 81b may be a film non-formed portion in which the insulation film 41 is not formed.

Since other structure of the third embodiment is the same as the previous embodiment shown in FIGS. 8 to 9, the same or corresponding elements are designated with the same symbols, and explanation thereof is omitted.

According to the third embodiment, the number of parts can be reduced, it is unnecessary to align the center shaft of the fixed magnetic member 32 with the center shaft of the center hole 30a of the bobbin 30 and fit the center shaft of the fixed magnetic member 32 into the center shaft of the center hole 30a of the bobbin 30 unlike the first embodiment shown in FIGS. 1 to 7 and the second embodiment shown in FIGS. 8 to 9, and thus, it becomes easier to assemble the solenoid portion 2.

According to the solenoid valve of the present invention as described in detail, it is possible to provide a solenoid valve in which the insulation performance of the solenoid valve can easily be secured without subjecting the coil of the solenoid valve to an insulating treatment, the outside shape of the solenoid valve is not increased and the number of operation steps is small, and the solenoid valve is capable of effectively the insulating treatment of the magnetic cover and capable of omitting the anticorrosion surface treatment of the magnetic cover.

What is claimed is:

1. A solenoid valve comprising:
   a valve section having a valve member which comes into contact and separates from a valve seat to switch passage; and
   a solenoid portion for driving the valve member, wherein the solenoid portion comprises,
   a fixed magnetic member,
   a bobbin around which a coil is wound,
   a hollow magnetic cover surrounding the coil and constituting an outer profile of the solenoid portion,
   a magnetic plate provided in the magnetic cover adjacent to the bobbin, and
   a moving core which is slidably fitted into center holes formed such as to pass through the magnetic plate and the bobbin and which is adsorbed by the fixed magnetic member,
   an electrical insulation film no thicker than a thickness of the magnetic cover is integrally formed on at least an inner surface among inner and outer surfaces of the magnetic cover, but not on the coil.

2. The solenoid valve according to claim 1, wherein the electrical insulation film is formed by one of the following methods: a method for painting epoxy resin on the magnetic cover, a method for spraying fluorocarbon resin, a method for coating ceramic, and a method for vacuum depositing electrical insulation material.

3. The solenoid valve according to claim 1, wherein the fixed magnetic member is a fixed core which is fitted and fixed to one end of the bobbin, the magnetic cover is hollow in shape, the magnetic cover is integrally provided at its axial one end with an occluded section which comes into contact with the fixed core, and is provided at its other end with an opening section.

4. The solenoid valve according to claim 3, wherein the magnetic cover has a contact surface or joint surface with respect to the magnetic plate and the fixed core constituting a magnetic circuit, and a film non-formed portion having no insulation film is formed on the contact surface or joint surface.

5. The solenoid valve according to claim 1, wherein the magnetic cover comprises a cylindrical cover provided at its axial opposite ends with opening sections, and a magnetic cap for closing one of the opening sections, the fixed magnetic member is a fixed core fixed to the magnetic cap, and the fixed core is inserted into the center hole of the bobbin.

6. The solenoid valve according to claim 5, wherein the magnetic cover has a contact surface or joint surface with respect to a member constituting a magnetic circuit, and a film non-formed portion having no insulation film is formed on the contact surface or joint surface.

7. The solenoid valve according to claim 1, wherein the magnetic cover comprises a cylindrical cover provided at its axial opposite ends with opening sections, and a magnetic cap for closing one of the opening sections, the magnetic cap is thicker than the cylindrical cover and also functions as the fixed magnetic member.

8. The solenoid valve according to claim 7, wherein the magnetic cover has a contact surface or joint surface with respect to a member constituting a magnetic circuit, and a film non-formed portion having no insulation film is formed on the contact surface or joint surface.

9. The solenoid valve according to claim 1, wherein a shape of a cross section of each of the bobbin, the center holes of the magnetic plate and the moving core is long ellipse or oval shape.

* * * * *